United States Patent
Taveau et al.

(10) Patent No.: US 8,781,393 B2
(45) Date of Patent: Jul. 15, 2014

(54) NETWORK UPDATES OF TIME AND LOCATION

(75) Inventors: Sebastien Taveau, Redwood City, CA (US); Carl Stone, Campbell, CA (US); Nadav Naaman, Palo Alto, CA (US); Hadi Nahari, Mountain View, CA (US)

(73) Assignee: Ebay Inc., San Jose, CA (US)

( * ) Notice: Subject to any disclaimer, the term of this patent is extended or adjusted under 35 U.S.C. 154(b) by 480 days.

(21) Appl. No.: 12/570,544

(22) Filed: Sep. 30, 2009

(65) Prior Publication Data

US 2011/0076942 A1    Mar. 31, 2011

(51) Int. Cl.
*H04B 5/00* (2006.01)

(52) U.S. Cl.
USPC ........................................ 455/41.1

(58) Field of Classification Search
CPC ....... H04N 7/157; H04W 4/02; H04W 60/00; H04W 4/22; H04W 12/12; H04M 3/42
USPC ................ 455/41.2, 456.1, 456.3, 456.6, 457
See application file for complete search history.

(56) References Cited

U.S. PATENT DOCUMENTS

| | | | |
|---|---|---|---|
| 6,175,922 B1 | 1/2001 | Wang | |
| 6,282,656 B1 | 8/2001 | Wang | |
| 6,594,759 B1 | 7/2003 | Wang | |
| 6,850,916 B1 | 2/2005 | Wang | |
| 6,868,391 B1 | 3/2005 | Hultgren | |
| 6,898,299 B1 | 5/2005 | Brooks | |
| 6,999,777 B1* | 2/2006 | Ganesh | 455/456.1 |
| 7,107,246 B2 | 9/2006 | Wang | |
| 7,303,120 B2 | 12/2007 | Beenau et al. | |
| 7,427,926 B2* | 9/2008 | Sinclair et al. | 340/4.2 |
| 7,500,607 B2 | 3/2009 | Williams | |
| 7,543,738 B1 | 6/2009 | Saunders et al. | |
| 7,635,084 B2 | 12/2009 | Wang et al. | |
| 7,690,577 B2 | 4/2010 | Beenau et al. | |
| 7,702,581 B2 | 4/2010 | Hogl | |
| 7,761,374 B2 | 7/2010 | Sahota et al. | |
| 2002/0023010 A1 | 2/2002 | Rittmaster et al. | |
| 2002/0023215 A1 | 2/2002 | Wang et al. | |
| 2002/0108062 A1 | 8/2002 | Nakajima et al. | |
| 2003/0236120 A1 | 12/2003 | Reece et al. | |
| 2004/0192383 A1* | 9/2004 | Zacks et al. | 455/557 |
| 2004/0203381 A1* | 10/2004 | Cahn et al. | 455/41.2 |
| 2007/0055632 A1 | 3/2007 | Hogl | |
| 2007/0188323 A1* | 8/2007 | Sinclair et al. | 340/568.1 |
| 2009/0005079 A1* | 1/2009 | Shields et al. | 455/456.3 |
| 2010/0035584 A1* | 2/2010 | Hadinata et al. | 455/413 |
| 2010/0174651 A1 | 7/2010 | Hogl | |

FOREIGN PATENT DOCUMENTS

| | | |
|---|---|---|
| EP | 0 848 360 | 6/1998 |
| WO | WO 2004/070492 | 8/2004 |

* cited by examiner

*Primary Examiner* — Duc Nguyen
*Assistant Examiner* — Ankur Jain
(74) *Attorney, Agent, or Firm* — Haynes and Boone, LLP

(57) ABSTRACT

Methods and systems utilize a shake and transfer process to initiate a wireless communication provide a user device with time and location information of the communication, which can be associated with contact information of a user of the other device. As a result, a user has additional information associated with a contact, and the time and location information can be used to determine or track elapsed time and distance traveled between communications.

16 Claims, 3 Drawing Sheets

NETWORK UPDATES OF TIME AND LOCATION

BACKGROUND

1. Field of the Invention

The present invention generally relates to wireless communications and more particularly to updating time and location information from a mobile device.

2. Related Art

With the ever-increasing use of mobile phones and devices, users desire such devices to have more and more capability other than conventional phone use. One area that is evolving is transfer of data through the phone. A recent development, called Bump™ developed by Bump Technologies, Inc., uses the near simultaneous movement of two devices in close proximity to effect a transfer of contact information. When a transfer is desired between a first device and a second device, both devices are shaken or moved, such that the movement is detected by each device, e.g., with an accelerometer within the device. Once detected, the device transmits location information, such as by a GPS unit or other location service unit within the device, to a server. The server processes the location information and determines whether another device at approximately the same location transmitted location information at approximately the same time. This may be accomplished by comparing time stamps from devices within a certain area. If the server detects more than two devices within an acceptable time period and within an acceptable distance from each other, the devices may be sent a message asking them to be shaken or moved again. This situation may arise in a crowded conference room where multiple users are trying to initiate a transfer with different parties.

Once two devices have been identified, each device is notified that a connection has been established and is asked whether it wants to exchange information with the other device (or more accurately, the user of the other device). If the user confirms the exchange, contact information is transmitted, creating a new contact or revising an old contact on the device. Users may define what contact information to exchange, such as email address, mailing address, and/or phone number.

As a result, users having mobile devices can exchange contact information without having to manually enter the information into the device. However, Bump™ is currently only used for exchanging user contact information. There may be different situations where Bump™ can be used, either alone or with other technologies, to improve the user experience with mobile devices or phones.

SUMMARY

According to one embodiment, a communication or transaction between two devices or users is initiated using a Bump™-type network. If the users have not exchanged contact information previously, the communication transfers contact information of one user to the other user and vice versa. That contact information is then stored onto the device. In addition to the contact information, the location and time of the exchange is also stored in the device, such as added to the contact information. This information is available through the Bump™-type network, since location and time information are required by the network to initiate the communication.

If the communication is between users who have already exchanged contact information, the time and location of the current communication will be stored in each user's device. As a result, a user can access a certain contact and see the times and locations of different meetings or exchanges. If a user's contact information has changed, the actual contact information may also be revised and updated. Thus, the user of the device has more information about the contact, which may be beneficial in many ways.

According to another embodiment, the user can utilize the time and location information available through a Bump™-type network to track time and/or location. For example, a user may "bump" his device with another user's device or a stationary device to record the time and location. At a later time and/or location, the user may again "bump" the device with another device or a stationary device to record that later time and/or location. As a result, the user can track a length of time, such as for babysitting or a service call, and/or distance or route, such as a business trip.

These and other features and advantages of the present invention will be more readily apparent from the detailed description of the embodiments set forth below taken in conjunction with the accompanying drawings.

Figure 1:
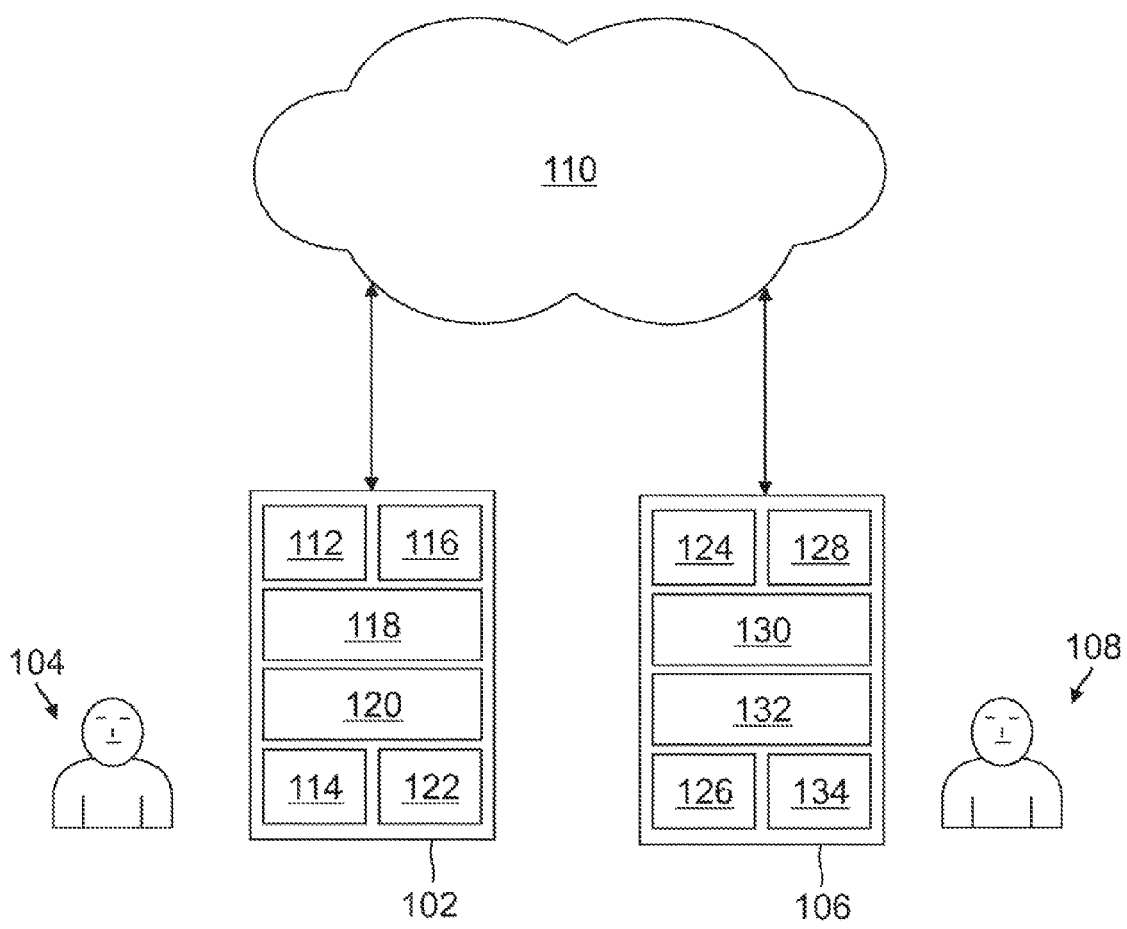
FIG. 1 is a block diagram of a system for transferring information using a shake and transfer process according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure enable users to leverage Bump™-type communications to both improve the user experience and increase mobile device uses. As used herein, the term "mobile device" is a broad term and may include, but is not limited to a cell phone, PDA, key fob, smartcard, laptop, PC, or similar type of augmented object or device.

According to one embodiment, location and/or time information is stored in mobile device(s) in a communication using a sequence of device shaking to establish a communication link and transferring the data through a network/server via the Internet or a "cloud" (also known as cloud computing), referred to herein as Bump™, Bump™-type communications, or more generally as "shake and transfer."

FIG. 1 shows a system 100 for storing location and/or time information on one or more mobile devices during a shake and transfer communication according to one embodiment. System includes a first mobile device 102 associated with a first user 104 and a second mobile device 106 associated with a second user 108 communication between each other through a Bump™-type network operated in a cloud 110. Mobile devices 102, 106 include a motion sensing element 112, 124, such as an accelerometer, to sense or recognize when the device is shaken or moved sufficiently for communication by the shake and transfer process. A processor 114, 126 in mobile devices 102, 106 receive signals from the motion sensing element in the respective devices, which causes the location of the device to be transmitted to cloud 110. The location information is obtained from a location device 116, 128, such as a GPS chip set, in each mobile device 102, 106.

The location information is processed by the network to determine the proximity of mobile device 102 and mobile device 106 relative to each other, as well as the time that location information was received by the network for each device. For example, a server for the network, operating in the cloud, may have a "time-stamp" for when location information is received. If the distance between mobile devices 102, 106 is within an acceptable distance and the time that location information was received from mobile devices 102, 106 is within an acceptable time period, then the network determines that communication is desired between the two devices. Note that this may require that only two such devices satisfy the time and distance requirements. In this case, if more than two devices meet the time and distance requirements of the network, the network may request those devices to be shaken again in order to better isolate the desired devices. Such a situation may arise in a crowded environment, e.g., a conference. However, it may be possible for communication to be established between more than two devices if the additional devices are also within the time and distance requirements. This and distance and time requirements may be determined by the network, based on various factors, such as processing capability and system resolution.

Devices 102, 106 also have a display 118, 130 that allows the user to view information on the device. For example, if the network requests that the devices be shaken again, such a message or request may be displayed to the device user so that the user can shake the device again. The display may be any suitable display type, such as an LCD screen or a TFT capacitive touch screen.

Devices 102, 106 also include a user interface (UI) 120, 132 that allows the user to enter information into the device for storage, transmission, or processing. For example, when the network establishes a communication between the two devices, the user typically has created a contact card that includes the information for transfer to a recipient. User 104, 108 can open the suitable application (App) and enter contact information via UI 120, 132, which is shown to user on display 118, 130. A storage or memory 122, 134 can store the contact information, which can be read or revised (written to), including new location and/or time information.

When connection is established by the network between device 102 and device 106, a confirmation request may appear on display 118, 130 of both devices, asking each user whether he wishes to exchange contact information with the user identified on the display. If so, the user may confirm via the UI or display (if it is a touch screen), which results in confirmation signals being transmitted to the network. Displays 118, 130 may display the progress of the information transfer, and once completed, indicate to the user that the contact information has been transferred. Memory 122, 134 can then store the contact information, which can now be accessed by the user.

The contact information stored in memory 122, 134 may also include a time and/or location of the communication between the two devices. In one embodiment, the network, using information available from a server, transmits time and/or location information during the communication. The time and location information can be in different formats. For example, the time may be GMT or be localized for the time zone of the device's registration or current location. The location may be coordinate information and/or identify the city, state, and/or country. The mobile device may store the time and/or location information from the network or convert the information to a desirable format, such as through the device processor, and then storing the converted information. The time and/or location information may then be viewed on the device display when the contact information is accessed. Each time the two users communicate, such as via the shake and transfer process, new time and/or location information is added to the contact information. Consequently, whenever a user accesses the contact information of another, the user can also see when and where the communications occurred.

The system of FIG. 1 can also be used to track time, location, and/or distance information on a user device, according to one embodiment, using the shake and transfer process. During a first communication with the network, time and/or location information is stored on device 102, 106. During a second communication or subsequent communications, new time and/or location information is stored. As a result, the user of the device can determine how much time elapsed between the communications and/or distances or locations traveled between the communications.

In the former case, this may be useful when preserving elapsed time is important. In one example, user 104 may be a parent, and user 108 may be a babysitter. When the babysitting starts, user 104 and user 108 bump or shake the respective devices to record a time and location, as well as identities of the users. When the babysitting ends, the parent or user 104 bumps device 102 with device 106 associated with the babysitter or user 108. Thus, both the parent and babysitter have an essentially indisputable record of the time elapsed for babysitting. This can be used in other scenarios, such as with service calls and appointments, where it may be important to track a meeting and/or a duration of a service. Because location information is also preserved, this may be useful for situations such as for deliveries. In that case, a delivery person may first bump with a device associated with a person or company providing the item(s) for delivery when picking up the item(s) and then bump with a device associated with a recipient when delivering the item(s).

There may also be situations where a user may want a record of where the user went, how long it took to get there, and/or how long the user stayed at a location. This may be useful for business travelers or vacationers alike. The user may bump a device at each desired location to record the time and location. If the user is traveling with someone with a similarly equipped device, the user may bump with that person. However, if the user is traveling alone or cannot communicate with another person using the shake and transfer process, it may still be possible for the user to receive and store the location and time information. One way would be for the user initiate the shake and transfer communication with an unattended or stationary device, where the user moves both his device and the other device to initiate the communication. For example, the whole device may be moved or a component on the device moved, such as a rotary dial, spring-biased lever, or similar movable component. In this case, one of mobile devices 102, 106 may not actually be mobile, but instead fixed at a position or location. A processor in the user's device may calculate distances, elapsed time, or otherwise process the time and/or location information from the network. Such devices may include a kiosk, unmanned or unattended merchant device, or a station at an airport.

Figure 2:
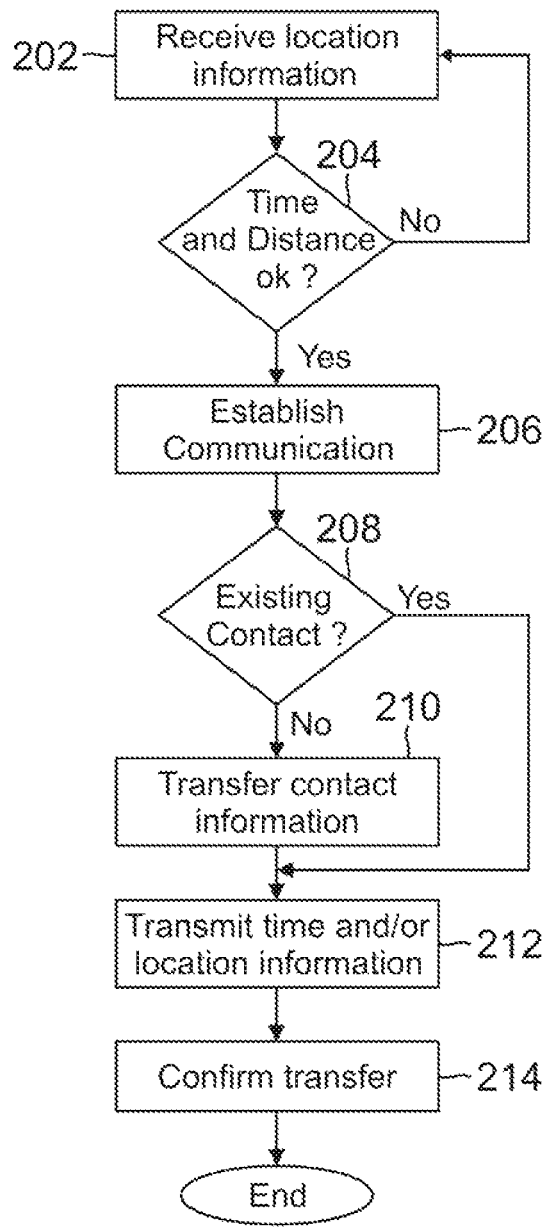
FIG. 2 is a flowchart showing a method for transferring location and time information according to one embodiment.

FIG. 2 is a flowchart showing a process for adding or including time and/or location information into a contact card, according to one embodiment. At step 202, the network, such as through a server, receives location information from two devices. As discussed above, this may occur when two devices (either mobile or stationary) are shaken to cause location information of the device to be transmitted to the network. If the two devices are within a required distance from each other and the location information was received from both devices within a required time period, as determined at step 204, a communication is established between the two devices at step 206. If either the condition is not met, the devices may be asked to shaken again and location information again received for processing.

Once communication is established, a determine is made at step 208 whether one or both devices already has an existing contact of the other device stored. For example, the system or server may make this determination by accessing the device, checking whether contact information was previously downloaded, or other suitable method. The device itself may make this determination by checking its memory for a matching contact, for example. If no existing contact is in the device, contact information is exchanged and a new contact is created at step 210. If contact information is already present in a device, step 210 may be skipped. Next, at step 212, time and/or location information of the communication is conveyed to the two devices.

As discussed above, time information can be the time that devices transmitted location information at step 202, in any suitable format and representation. For example, the time zone may be where the system or server is located, where the devices are making the communication, i.e., their local time zone, or where the devices were registered, i.e., the home time zone. These, or other time zones, may be set by the user if desired. The format may be set by the system or defined by the user, such as "month day, year" and "hour second am/pm" or any other suitable representation. The user's device may also convert or change the format for display and storage if desired.

Location information may likewise be presented and stored in many different formats. For example, the location may be longitude and latitude coordinates, a city/state/county, or a name, such as a landmark, hotel, etc. The user's device may convert coordinates as needed or desired.

Once the time and location information has been transferred to the device(s), the system may confirm the transfer with a message to the device(s). At this point, the device(s) have a time and location associated with a particular contact. As a result, when the user retrieves a contact stored in the device, the user sees contact information, such as email, phone number, and/or address(es), as well as a list of one or more times and locations where the user met with the contact. In different embodiments, the user may add notes to each meeting or otherwise edit the displayed information as desired. Consequently, the user is able to maintain more detailed information about the user's contacts, which may be advantageous in both work and social situations.

The ability to have location and/or time information associated with a contact, user, or device may have many different types of use cases. For example, a user, on its device, may be able to track elapsed time at a location (time spent babysitting, on a service call, doing a chore, etc.), track time between two or more locations (for business travel, vacation, deliveries, etc.), determine the distance between two or more locations (for business travel, vacation, deliveries, etc.), map out places traveled and time spent either at each place and/or getting to each place, or a combination thereof. The time and/or location information may be downloaded to the user's device by shaking the device at the same time as another device is shaken, either by the user or by another.

Figure 3:
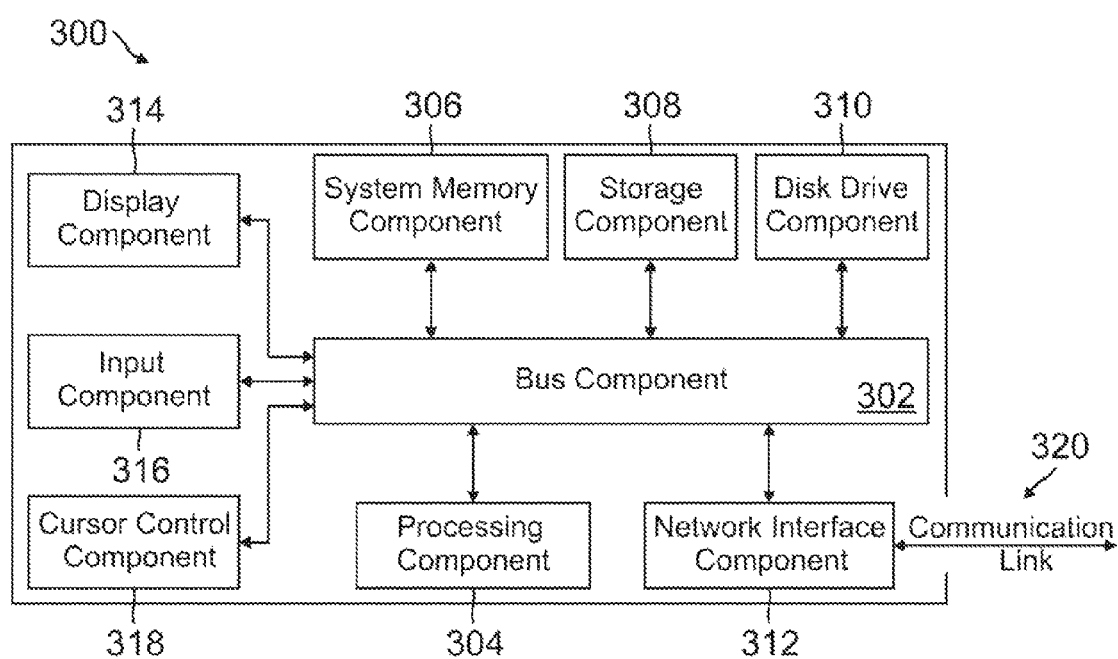
FIG. 3 is a block diagram of one embodiment of a system that can be used to implement one or more components of the systems described herein.

FIG. 3 is a block diagram of a computer system 300 according to one embodiment, which may be suitable for implementing embodiments of various aspects of this disclosure, including, for example, device 102, 106, and/or a server or other component for handling the location and time processing. In implementations of various embodiments, the devices may comprise a personal computing device, such as a personal computer, laptop, PDA, cellular phone, other personal computing or communications devices, or a network computing device, such as one or more servers, using computer system 300.

In one embodiment, computer system 300 may include a bus 302 or other communication mechanism for communicating information, which interconnects subsystems and components, such as a processing component 304 (e.g., processor, micro-controller, digital signal processor (DSP), etc.), a system memory component 306 (e.g., RAM), a static storage component 308 (e.g., ROM), a disk drive component 310 (e.g., magnetic or optical), a network interface component 312 (e.g., modem or Ethernet card), a display component 314 (e.g., CRT or LCD), an input component 316 (e.g., keyboard or keypad), and/or a cursor control component 318 (e.g., mouse or trackball). In one embodiment, disk drive component 310 may comprise a database having one or more disk drive components.

Computer system 300 may perform specific operations by processor 304 executing one or more sequences of one or more instructions contained in system memory component 306, according to steps described above. Such instructions may be read into system memory component 306 from another computer readable medium, such as static storage component 308 or disk drive component 310. In other embodiments, hard-wired circuitry may be used in place of or in combination with software instructions to implement the invention.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 300. In other embodiments, a plurality of computer systems 300 coupled by communication link 320 (e.g., LAN, WLAN, PTSN, or various other wired or wireless networks) may perform instruction sequences to practice the invention in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A method of wirelessly communicating information, comprising:
   establishing a communication link between a first device and a second device based on a shake of the first and second devices;
   transferring time and location information to the first device associated with a first user, wherein the time information is based on when the location information is received and is associated with a second user of the second device;
   determining whether the second user is an existing contact stored in the first device; and
   updating contact information on the first device by adding the time and location information, without replacing previously stored time and location information, to contact information under the second user each time a time and location information is transferred to the first device from the second device of the second user, the contact information visible to the first user on the first device when contact information for the second user is viewed and comprising different times and locations an in-person meeting occurred between the first user and the second user, wherein the time and location information are used to determine an elapsed time and a distance between a first and a second communication established based on a shake of the first and second devices.

2. The method of claim 1, further comprising confirming the time and location information has been successfully transferred.

3. The method of claim 1, wherein at least one of the first and second devices enables a user to enter information associated with the time and location information transferred.

4. The method of claim 1, wherein both the time and location information are transferred to the first and second devices.

5. The method of claim 1, wherein the first and second devices are mobile devices.

6. The method of claim 1, wherein the first device is a mobile device and the second device is a stationary device.

7. The method of claim 1, wherein the time information is used to determine an elapsed time between a first and a second communication established based on a shake of the first and second devices.

8. The method of claim 1, wherein the location information is used to determine a distance between a first and a second communication established based on a shake of the first and second devices.

9. A non-transitory machine-readable medium comprising a plurality of machine-readable instructions which when executed by one or more processors of a server are adapted to cause the server to perform a method comprising:
   establishing a communication link between a first device and a second device based on a shake of the first and second devices;
   transferring time and location information to the first device associated with a first user, wherein the time information is based on when the location information is received and is associated with a second user of the second device;
   determining whether the second user is an existing contact stored in the first device; and
   updating contact information on the first device by adding the time and location information, without replacing previously stored time and location information, to contact information under the second user each time a time and location information is transferred to the first device from the second device of the second user, the contact information visible to the first user on the first device when contact information for the second user is viewed and comprising different times and locations an in-person meeting occurred between the first user and the second user, wherein the time and location information are used to determine an elapsed time and a distance between a first and a second communication established based on a shake of the first and second devices.

10. The non-transitory machine-readable medium of claim 9, wherein both the time and location information are transferred to the first and second devices.

11. The non-transitory machine-readable medium of claim 9, wherein the first and second devices are mobile devices.

12. The non-transitory machine-readable medium of claim 9, wherein the time information is used to determine an elapsed time between a first and a second communication established based on a shake of the first and second devices.

13. The non-transitory machine-readable medium of claim 9, wherein the location information is used to determine a distance between a first and a second communication established based on a shake of the first and second devices.

14. The non-transitory machine-readable medium of claim 9, wherein the method further comprises confirming the time and location information has been successfully transferred.

15. The non-transitory machine-readable medium of claim 9, wherein at least one of the first and second devices enables a user to enter information associated with the time and location information transferred.

16. The non-transitory machine-readable medium of claim 9, wherein the first device is a mobile device and the second device is a stationary device.

* * * * *